United States Patent
Lee (10) Patent No.: US 9,797,729 B1
(45) Date of Patent: Oct. 24, 2017

(54) SYSTEMS AND METHODS FOR AUTOMATIC FIT ADJUSTMENT OF A WEARABLE DEVICE

(71) Applicant: Toyota Motor Engineering & Manufacturing North America, Inc., Erlanger, KY (US)

(72) Inventor: Christopher P. Lee, Campbell, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/333,719

(22) Filed: Oct. 25, 2016

(51) Int. Cl.
| | |
|---|---|
| *G01C 21/16* | (2006.01) |
| *G01C 21/20* | (2006.01) |
| *G01C 21/18* | (2006.01) |
| *G09B 21/00* | (2006.01) |
| *G08B 3/10* | (2006.01) |
| *G08B 6/00* | (2006.01) |

(52) U.S. Cl.
CPC .......... *G01C 21/165* (2013.01); *G01C 21/18* (2013.01); *G01C 21/20* (2013.01); *G09B 21/001* (2013.01); *G08B 3/10* (2013.01); *G08B 6/00* (2013.01)

(58) Field of Classification Search
None
See application file for complete search history.

(56) References Cited

U.S. PATENT DOCUMENTS

| | | | | |
|---|---|---|---|---|
| 3,964,654 | A | * | 6/1976 | Wittenberger ............ A45F 3/04 224/259 |
| 8,717,165 | B2 | | 5/2014 | Gernandt et al. |
| 9,107,011 | B2 | | 8/2015 | Broadley et al. |
| 2007/0124975 | A1 | | 6/2007 | Kasprzak |
| 2009/0253996 | A1 | * | 10/2009 | Lee ....................... A61B 5/0476 600/544 |
| 2012/0324946 | A1 | | 12/2012 | Latouf |
| 2015/0165222 | A1 | | 6/2015 | Oskin et al. |
| 2015/0190052 | A1 | | 7/2015 | Vaitaitis |
| 2015/0366504 | A1 | * | 12/2015 | Connor ................ A61B 5/6804 600/301 |
| 2016/0129279 | A1 | * | 5/2016 | Ferolito ............... A61N 5/0618 607/89 |
| 2016/0334644 | A1 | * | 11/2016 | Garofolo .................. G02C 7/14 |

FOREIGN PATENT DOCUMENTS

WO 2015084653 A1 6/2015

* cited by examiner

*Primary Examiner* — Russell Frejd
(74) *Attorney, Agent, or Firm* — Dinsmore & Shohl LLP (57) ABSTRACT

Systems and methods for automatic adjustment of a wearable device are provided. One embodiment of a method includes determining whether a navigation sensor is in a desired position and, in response to determining that the navigation sensor is not in a desired position, determining a desired modification to the navigation sensor for achieving the desired position. Some embodiments include determining a change of a repositioning device for achieving the desired modification to the navigation sensor and actuating the repositioning device to implement the change.

20 Claims, 6 Drawing Sheets

SYSTEMS AND METHODS FOR AUTOMATIC FIT ADJUSTMENT OF A WEARABLE DEVICE

TECHNICAL FIELD

Embodiments described herein generally relate to systems and methods for automatic fit adjustment of a wearable device and, more specifically, to systems and methods that automatically adjust a sensor or other portion of a wearable device.

BACKGROUND

Many current devices that assist visually-impaired users have no features that allow for a fitting adjustment on the particular user. As an example, a blind-aid (BLAID) device may include a necklace, glasses, bracelets, and/or other wearable sensors that assist the vision-impaired user to navigate an environment. While these BLAID devices are useful, it is often difficult for a vision-impaired user to notice that a wearable device is offset and difficult for the user to know that the device requires intervention to correct the problem. Typically, for a neck-worn device, the only way to know if the device is being worn correctly is self-awareness (e.g., a visual check in a mirror) or for another person to notice. Additionally, the device itself may be properly worn, but one of the sensors may not be ideally positioned for use. Thus, a need exists in the industry.

SUMMARY

Systems and methods for automatic adjustment of a wearable device are provided. One embodiment of a method includes determining whether a navigation sensor is in a desired position and, in response to determining that the navigation sensor is not in a desired position, determining a desired modification to the navigation sensor for achieving the desired position. Some embodiments include determining a change of a repositioning device for achieving the desired modification to the navigation sensor and actuating the repositioning device to implement the change.

In another embodiment, a system includes a navigation sensor that is coupled to the wearable device and a repositioning device that is coupled to the wearable device. In some embodiments, the system includes a computing device that is communicatively coupled to the navigation sensor and the repositioning device. The computing device may include logic that causes the system to determine whether the navigation sensor is in a desired position and, in response to determining that the navigation sensor is not in a desired position, determine a desired modification to the navigation sensor for achieving the desired position. In some embodiments, the logic causes the system to determine a change of the repositioning device for achieving the desired modification to the navigation sensor and actuate the repositioning device to implement the change.

In yet another embodiment, a system includes a wearable device for assisting a vision-impaired user, where the wearable device includes a navigation sensor for detecting at least one feature of an environment and where the wearable device includes a repositioning device for mechanically repositioning at least a portion of the wearable device. Embodiments of the system also include a computing device that is communicatively coupled to the navigation sensor and the repositioning device, where the computing device includes logic that causes the system to receive environment data from the navigation sensor and determine, from the environment data, whether the navigation sensor is in a desired position. In some embodiments, the logic may cause the system to, in response to determining that the navigation sensor is not in the desired position, determine, from the desired position and the environment data, a desired repositioning to the navigation sensor for achieving the desired position. In some embodiments, the logic causes the system to determine a change of the repositioning device for achieving the desired repositioning to the navigation sensor and actuate the repositioning device to implement the change.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for automatic fit adjustment for wearable devices. Some embodiments are configured for a vision assist wearable device, such as a BLAID device to alert the user to correct a fitting of the necklace, glasses, bracelet, etc and/or auto-correct itself using a repositioning device, such as an inflatable airbag mechanism, to achieve a desired position and orientation of the BLAID device and/or corresponding sensor. Accordingly, embodiments may utilize an inertial measurement unit (IMU) to sense movement through gyroscopic motion or vibrations to stabilize the BLAID device. The same IMU data may be utilized in relation to how the device is designed to be worn on the body.

When compared against designed-for position, these embodiments may provide an instruction to the user on how to correct the position of the device and/or sensor. For example, if the user is unaware that one side of the device is drooping, off-kilter, upside down, backwards, or otherwise does not correspond with expected data, the device could alert the user via an repositioning output device that provides an at least one repositioning command in the form of an audible output, a tactile output, and/or the like with an instruction to adjust the position of the wearable device for optimal usage. A navigational output device may also be included for providing at least one navigational command to the user for navigating the environment. In some embodiments, the navigational output device and the repositioning output device are the same output device; however this is not a requirement.

Additionally, embodiments may also include a pump to inflate or deflate the inflatable bladders to automatically correct the offset. For example, chest angles may vary widely among users that can cause the device to tilt and yaw. Therefore, the inflatable bladders, which may be located on the backside of the arms, may inflate or deflate to achieve the designed viewing angle.

Embodiments may also be configured to be worn naturally over existing clothing. Accordingly, the device may be adjusted daily depending on the clothing articles. The systems and methods for automatic fit adjustment for wearable devices incorporating the same will be described in more detail, below.

Figure 1:
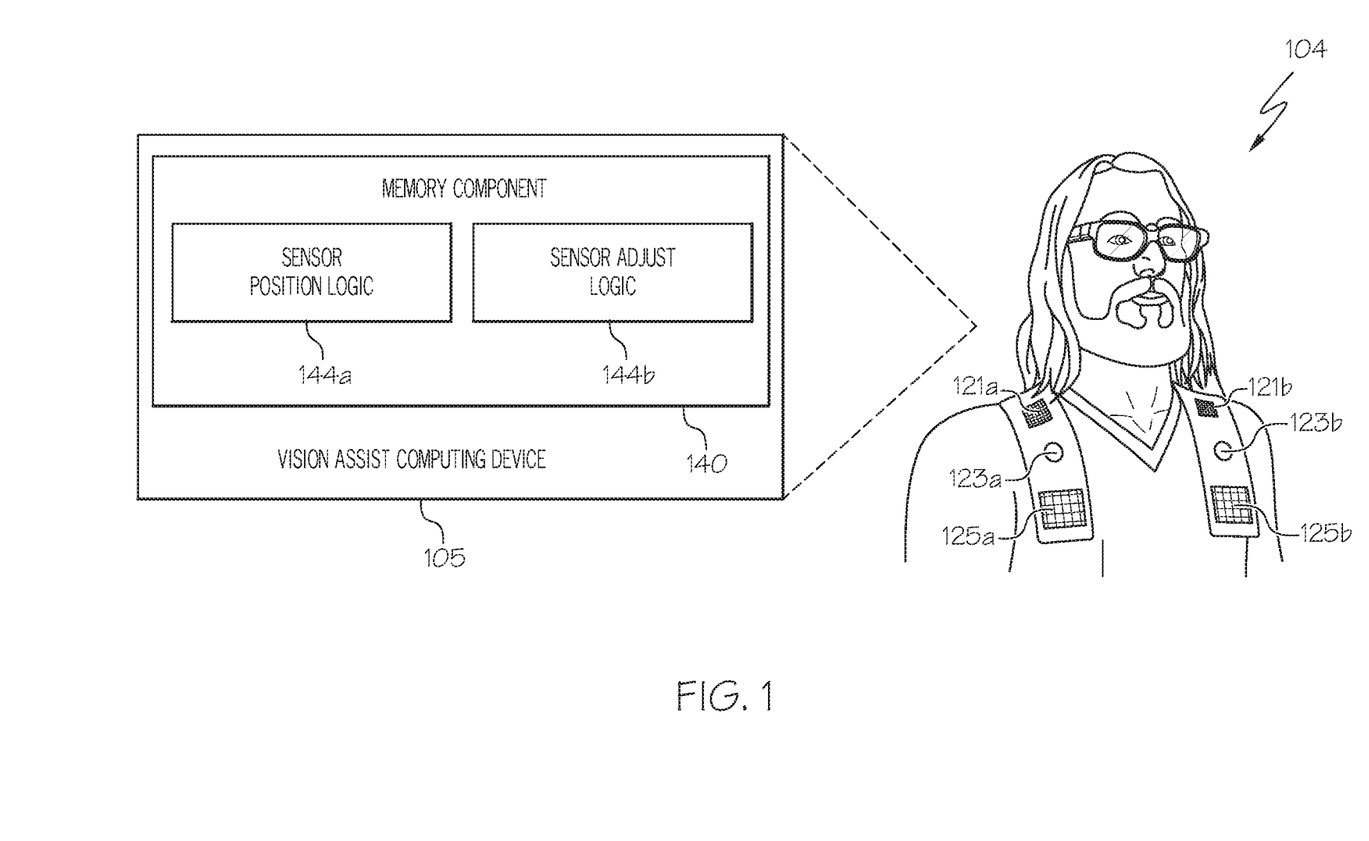
FIG. 1 depicts a wearable device, according to embodiments described herein.

Referring now to the drawings, FIG. 1 depicts a wearable device 104, according to embodiments described herein. As illustrated, the wearable device 104 may include a vision assist computing device 105, as well as a plurality of navigation sensors. The navigation sensors may include image capture devices 121a, 121b, positioning sensors 123a, 123b, and motion sensors 125a, 125b. Navigation sensors may also include at least one microphone, at least one radar sensor, a gyroscope, an accelerometer, an IMU, and/or other sensors and hardware for detecting at least one feature of the environment as well as assisting the user to navigate the environment.

Accordingly, the image capture device 121a, 121b may include a digital camera, still camera, a video camera, an infrared camera, and/or other device for capturing still imagery and/or motion imagery. The positioning sensor 123a, 123b may include a global positioning device and/or other device for communicating with satellites, cell towers, WiFi hotspots, and/or other remote hardware for determining a position and/or movement of the user. The motion sensor 125a, 125b may similarly include an accelerometer, a gyroscope, an IMU, and/or other device for determining the current motion of the user.

The vision assist computing device 105 is coupled to at least a portion of the navigation sensors and may include a memory component 140, which stores sensor position logic 144a and sensor adjust logic 144b. As described in more detail below, the sensor position logic 144a may receive data from the navigation sensors and/or from repositioning sensors (described in more detail in FIG. 2B) to determine the location of the user, the location objects in the environment, and/or the orientation of respective sensors. The sensor adjust logic 144b may be configured to cause the system to determine an adjustment to the user's position, to a navigation sensor, to a repositioning sensor 260a, and/or to the wearable device 104 as a whole.

As an example, if the user is being routed to a destination, the sensor position logic 144a may be utilized to receive environment data from the navigation sensors and determine commands for avoiding objects and reaching a desired destination. Similarly, the sensor position logic 144a may receive data from one or more of the navigation sensors and/or one or more of the repositioning sensors and determine whether at least a portion of the navigation sensors are correctly positioned and/or aligned.

Similarly, the sensor adjust logic 144b may utilize data associated with the position and orientation of the navigation sensors and determine a desired position of the navigation sensors, as well as an adjustment of at least one of the navigation sensors to a desired position and/or orientation. The sensor adjust logic 144b may cause the vision assist computing device 105 to cause a repositioning device (described in more detail in FIG. 2B) to actuate, thereby moving the navigation sensor to the desired position and/or orientation.

Figure 2A:
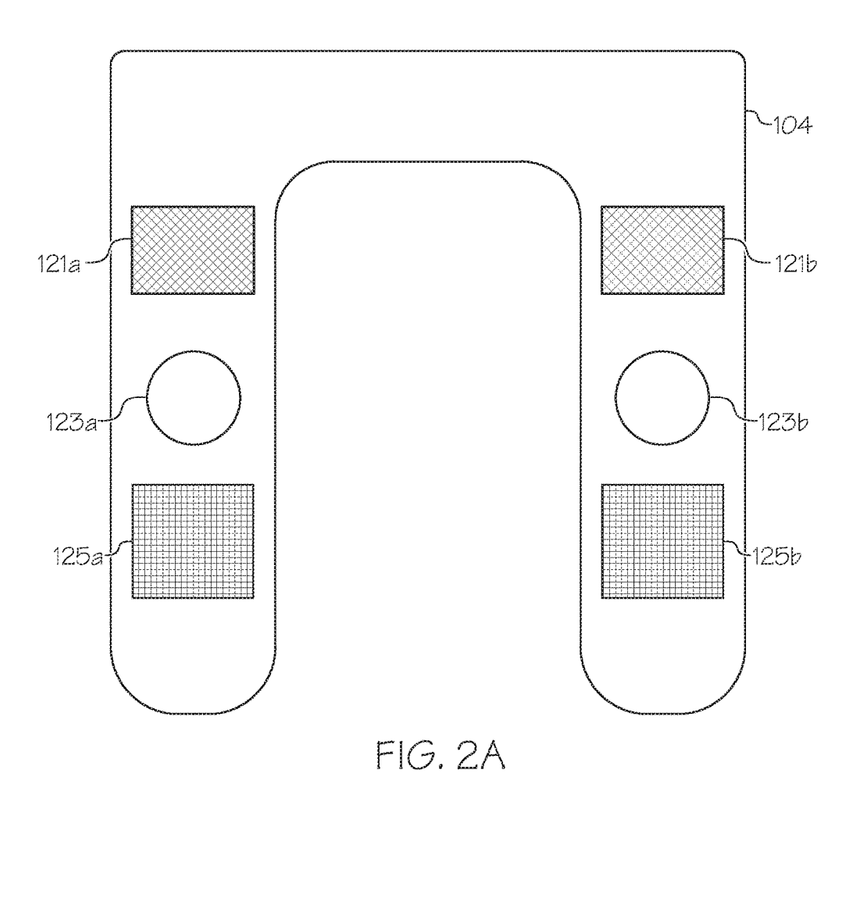
FIG. 2A depicts a front view of a wearable device, further illustrating a plurality of sensors, according to embodiments described herein.

FIG. 2A depicts a front view of a wearable device 104, further illustrating a plurality of sensors, according to embodiments described herein. As illustrated, the wearable device 104 includes navigation sensors, such as the image capture devices 121a, 121b, the positioning sensors 123a, 123b, and the motion sensors 125a, 125b. These navigation sensors may be configured to assist the user in navigating from a current location to a destination. Additionally, the navigation sensors may be configured to capture data related to the environment to determine whether the navigation sensors are properly positioned.

As an example, if an image captured by the image capture device 121a is askew (or otherwise not aligned with an expected image), the vision assist computing device 105 may determine that the image capture device 121a should be repositioned. Similarly, if the image captured by the image capture device 121b is dark, the vision assist computing device 105 may determine that the image capture device 121b is being blocked by another object. As such, the vision assist computing device 105 may provide a command to the user to move the object from view via a repositioning output device, such as an auditory output device and/or a tactile output device. In some embodiments, the repositioning devices (described with reference to FIG. 2B) may move the wearable device 104 to a desired position.

Similarly, a determination may be made that at least one of the motion sensors 125a, 125b is out of position and/or out of proper orientation. This determination may be made through a detection of motion or position by an accelerometer, a gyroscope, and/or an IMU that is included with the motion sensor 125a and/or with the wearable device 104. In response, a signal may be sent by the vision assist computing device 105 to automatically adjust and/or command the user to adjust.

Figure 2B:
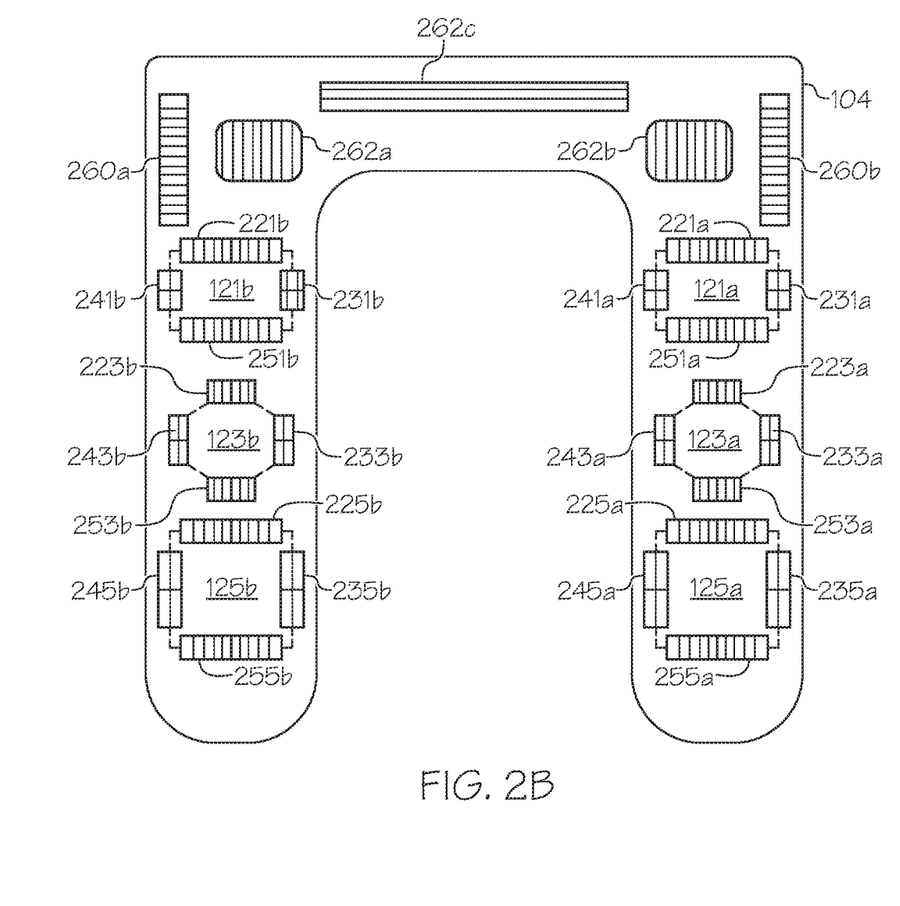
FIG. 2B depicts a rear view of the wearable device, illustrating a repositioning device, according to embodiments described herein.

FIG. 2B depicts a back side view of the wearable device 104, illustrating a repositioning device, according to embodiments described herein. As illustrated, the wearable device 104 may also include a plurality of repositioning devices for automatically adjusting the respective sensors. As an example, the image capture device 121a may have at least one inflatable bladder 221a, 231a, 241a, 251a that is coupled to the wearable device 104 on an outer perimeter of the image capture device 121a. At least one inflatable bladder 221b, 231b, 241b, 251b may be coupled to the wearable device 104 on an outer perimeter of the image capture device 121b.

Similarly, at least one inflatable bladder 223a, 233a, 243a, 253a may be coupled to the wearable device 104 on an outer perimeter of the positioning sensor 123a. At least one inflatable bladder 223b, 233b, 243b, 253b may be coupled to the wearable device 104 on an outer perimeter of the positioning sensor 123b. At least one inflatable bladder 225a, 235a, 245a, 255a may be coupled to the wearable device 104 on an outer perimeter of the motion sensor 125a. At least one inflatable bladder 225b, 235b, 245b, 255b may be coupled to the wearable device 104 on an outer perimeter of the motion sensor 125b. As such, if it is determined that at least one of the image capture devices 121a, 121b, at least one of the positioning sensors 123a, 123b, and/or at least one of the motion sensors 125a, 125b is out of position or orientation, the vision assist computing device 105 may determine that the motion sensor 125a is out of position; may determine a manner to put the motion sensor 125a in a desired position; and may command actuation of the appropriate inflatable bladder (and/or other repositioning device) to adjust the position of that particular sensor.

Also included in FIG. 2B are repositioning sensors 260a, 260b. One or more of the repositioning sensors 260a, 260b may be configured with an accelerometer, a gyroscope, IMU, and/or other device to determine a position, motion, and/or orientation of the wearable device 104 on the user's body. As an example, an angle of the repositioning sensor 260a may be determined relative to level and/or relative to an angle of the repositioning sensor 260b. If the determined angle is not within a desired threshold angle, the vision assist computing device 105 may determine that the wearable device 104 is misplaced on the user's body.

Similarly, if the vision assist computing device 105 determines that the angle of the repositioning sensor 260a is not within a predetermined threshold of the angle of the repositioning sensor 260b, the vision assist computing device 105 may similarly determine that the wearable device 104 is not situated properly. As a result, the vision assist computing device 105 may determine an adjustment to the wearable device 104 and communicate that adjustment to the appropriate rotating continuous track 262a, 262b, 262c. The rotating continuous tracks 262a, 262b, 262c may be configured to move along the body of the user, to reposition the wearable device 104 according to a desired position. In some embodiments, the repositioning device may actuate, but be unable to correct the determined positioning issue. The vision assist computing device 105 may determine that the repositioning device was unable to correct the issue and inform the user on a manner to properly position the wearable device 104.

It should be understood that embodiments described herein may be configured such that the navigation sensors and the repositioning sensors are part of the same device. Similarly, some embodiments may be configured such that at least one of the navigation sensors is different than at least one of the repositioning sensors 260a, 260b. Thus the image capture device 121a may operate as a repositioning sensor and a navigation sensor. However, some embodiments may have dedicated sensors for navigation and repositioning.

It should also be understood that while the inflatable bladders 221-255 are depicted as surrounding a perimeter of the respective sensor, this is also an example. Other configurations of inflatable bladders 221-255 may be utilized to appropriately reposition the desired sensor. Similarly, while the inflatable bladders 221-255 and the rotating continuous tracks 262a, 262b, 262c are depicted in FIG. 2, other repositioning sensors and/or repositioning devices, such as at least one lever, at least one motor, and the like may be utilized for repositioning the sensors and/or the wearable device 104.

Figure 3:
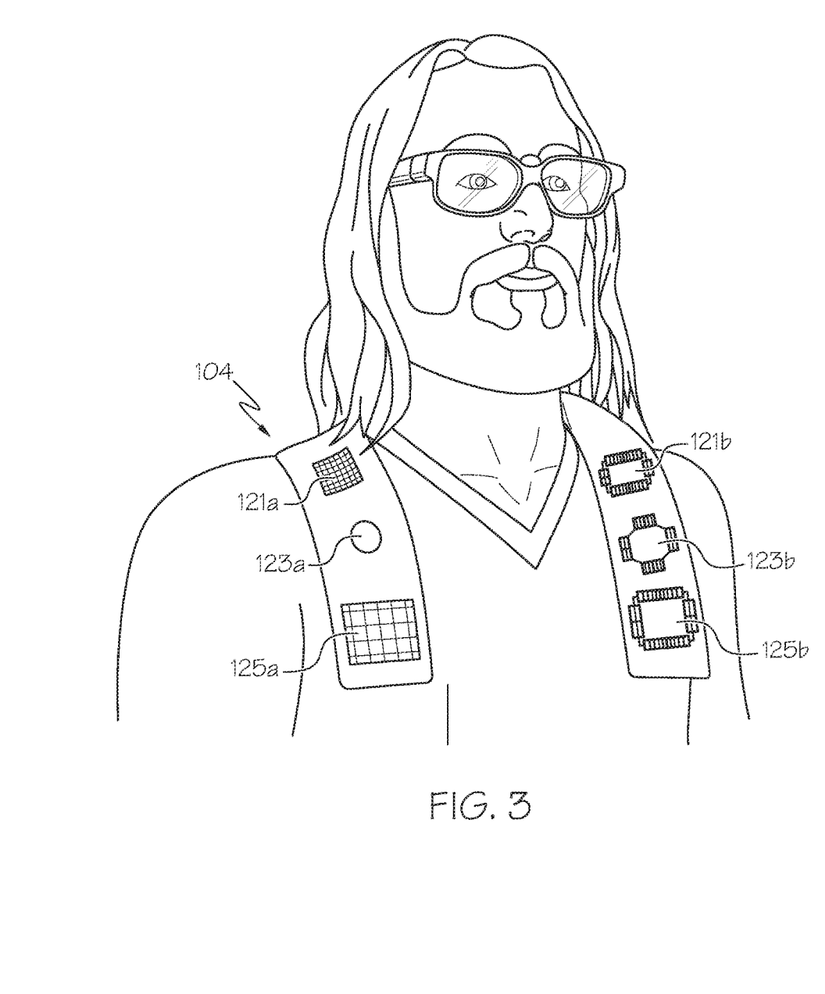
FIG. 3 depicts a user wearing a wearable device, where the wearable device has at least one sensor that is out of position, according to embodiments described herein.

FIG. 3 depicts a user wearing a wearable device 104, where the wearable device 104 has at least one sensor that is out of position, according to embodiments described herein. As illustrated, the wearable device 104 is being worn by the user in an undesirable orientation. Specifically, the left side of the wearable device 104 has been twisted such that the image capture device 121b, the positioning sensor 123b, and the motion sensor 125b are directed toward the user, instead toward the environment. As such, these sensors may not accurately provide navigational instructions or other information to the user.

Depending on the particular embodiment, a repositioning sensor may detect this positioning issue. The vision assist computing device 105 may determine a manner to address this positioning issue and command an appropriate repositioning device to automatically adjust the wearable device 104 to correct the position of the wearable device 104.

As another example, if a navigation sensor is caught on some of the user's clothing, causing the sensor to be mis-positioned, the repositioning device may actuate to correct the issue. Some embodiments may provide commands to the user for making this correction. Similarly, the wearable device 104 may have one or more sensors covered with hair, may get caught on the user's shirt, and/or may otherwise be obstructed or out of position. Accordingly, the repositioning sensors 260a may detect this defect and the vision assist computing device 105 may instruct the appropriate repositioning device to make the correction and/or provide a command to an output device to instruct the user to make the correction.

Figure 4:
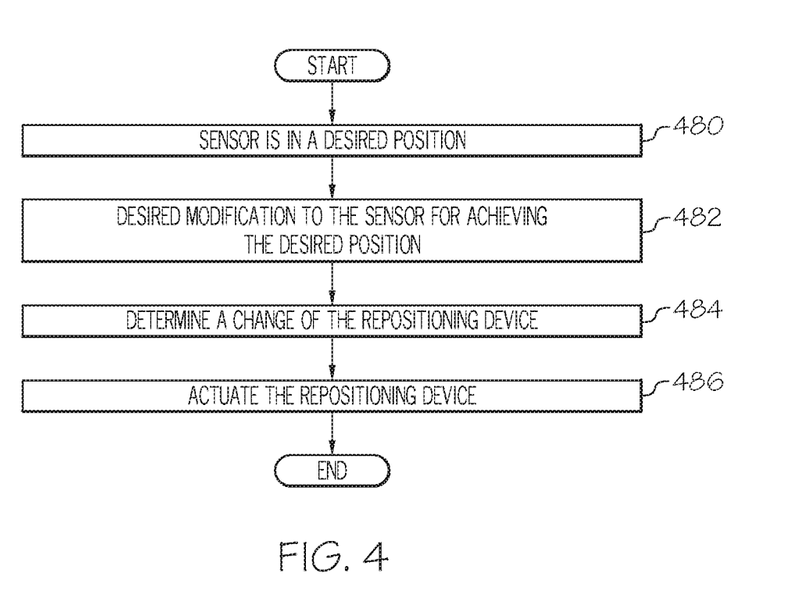
FIG. 4 depicts a flowchart for automatic adjustment of a wearable device, according to embodiments described herein.

FIG. 4 depicts a flowchart for automatic adjustment of a wearable device 104, according to embodiments described herein. As illustrated in block 480, a determination may be made regarding whether a navigation sensor is in a desired position. In block 482, a determination may be made regarding a desired modification to the sensor for achieving the desired position of the sensor. In block 484, a determination may be made regarding a change of a repositioning device for achieving the desired modification to the sensor. In block 486, the repositioning device may be actuated to implement the change.

Figure 5:
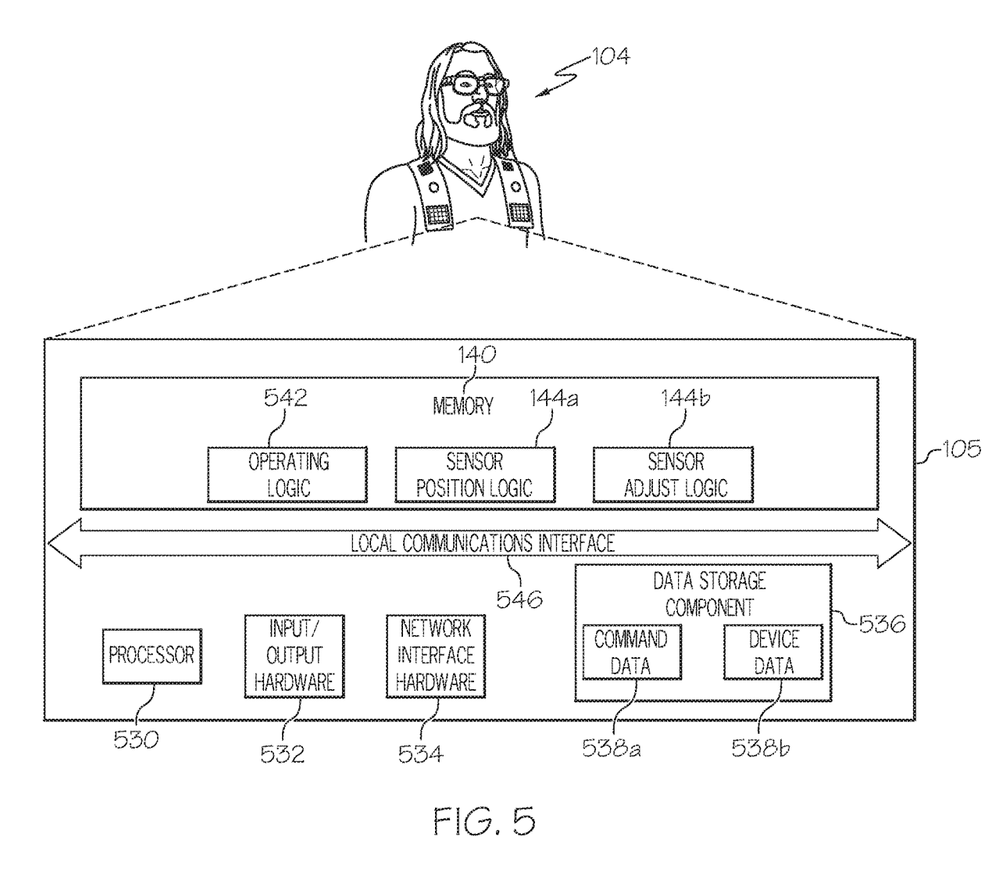
FIG. 5 depicts a computing device that is utilized with the wearable device, according to embodiments described herein.

FIG. 5 depicts a vision assist computing device 105 that is utilized with the wearable device 104, according to embodiments described herein. The vision assist computing device 105 includes a processor 530, input/output hardware 532, the network interface hardware 534, a data storage component 536 (which stores command data 538a, device data 538b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vision assist computing device 105 and/or external to the vision assist computing device 105.

The memory component 140 may store operating logic 542, the sensor position logic 144a, and the sensor adjust logic 144b. The sensor position logic 144a and the sensor adjust logic 144b may each include a plurality of different pieces of logic, each of which may be embodied as a computer program, firmware, and/or hardware, as an example. A local communications interface 546 is also included in FIG. 5 and may be implemented as a bus or other communication interface to facilitate communication among the components of the vision assist computing device 105.

The processor 530 may include any processing component operable to receive and execute instructions (such as from a data storage component 536 and/or the memory component 140). As described above, the input/output hardware 532 may include and/or be configured to interface with the sensors, devices, and other components of the wearable device 104.

The network interface hardware 534 may include and/or be configured for communicating with any wired or wireless networking hardware, including an antenna, a modem, LAN port, wireless fidelity (Wi-Fi) card, WiMax card, Bluetooth chip, USB card, mobile communications hardware, and/or other hardware for communicating with other networks and/or devices. From this connection, communication may be facilitated between the vision assist computing device 105 and other computing devices, such as a mobile device, a server, etc.

The operating logic 542 may include an operating system and/or other software for managing components of the vision assist computing device 105. As also discussed above, the sensor position logic 144a may reside in the memory component 140 and may be configured to cause the processor 530 to determine position and/or orientation of a navigation sensor and/or a repositioning sensor, as described above. Similarly, the sensor adjust logic 144b may be utilized to cause a repositioning of the navigation sensors and/or repositioning sensor, according to a desired position.

It should be understood that while the components in FIG. 5 are illustrated as residing within the vision assist computing device 105, this is merely an example. In some embodiments, one or more of the components may reside external to the vision assist computing device 105. It should also be understood that, while the vision assist computing device 105 is illustrated as a single device, this is also merely an example. In some embodiments, the sensor position logic 144a and the sensor arrange logic 144b may reside on different computing devices. As an example, one or more of the functionality and/or components described herein may be provided by a remote computing device and/or mobile device, which may be coupled to the vision assist computing device 105 via a network, such as a local network and/or a wide area network.

Additionally, while the vision assist computing device 105 is illustrated with the sensor position logic 144a and the sensor arrange logic 144b as separate logical components, this is also an example. In some embodiments, a single piece of logic may cause the vision assist computing device 105 to provide the described functionality.

As illustrated above, various embodiments of systems and methods for automatic adjustments of a wearable device are disclosed. As described above, these embodiments may be configured to ensure that a vision-assist device is properly positioned to allow for optimal environmental sensing and navigating.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for automatic adjustment of a wearable device. It should also be understood that these embodiments are merely exemplary and are not intended to limit the scope of this disclosure.

What is claimed is:

1. A method for automatic fit adjustment of a wearable device:
    determining whether a navigation sensor is in a desired position;
    in response to determining that the navigation sensor is not in a desired position, determining a desired modification to the navigation sensor for achieving the desired position;
    determining a change of a repositioning device for achieving the desired modification to the navigation sensor; and
    actuating the repositioning device to implement the change.

2. The method of claim 1, wherein a repositioning sensor is utilized for determining the change of the repositioning device, and wherein the repositioning sensor includes at least one of the following: an image capture device, a gyroscope, an accelerometer, an internal measurement unit (IMU), or a positioning device.

3. The method of claim 1, wherein the navigation sensor includes at least one of the following: an image capture device, a microphone, a positioning sensor, or a motion sensor.

4. The method of claim 1, wherein the repositioning device includes at least one of the following: an inflatable bladder, a lever, a motor, or a rotating continuous track.

5. The method of claim 1, further comprising providing at least one navigational command to a user, via at least one of the following: an auditory output device or a tactile output device.

6. The method of claim 1, further comprising providing a repositioning command to a user for manually repositioning the wearable device.

7. A system for automatic fit adjustment of a wearable device:
    a navigation sensor that is coupled to the wearable device;
    a repositioning device that is coupled to the wearable device; and
    a computing device that is communicatively coupled to the navigation sensor and the repositioning device, wherein the computing device includes logic that performs at least the following:
        determine whether the navigation sensor is in a desired position;
        in response to determining that the navigation sensor is not in a desired position, determine a desired modification to the navigation sensor for achieving the desired position;
        determine a change of the repositioning device for achieving the desired modification to the navigation sensor; and
        actuate the repositioning device to implement the change.

8. The system of claim 7, further comprising the wearable device, wherein the wearable device includes the navigation sensor, wherein the wearable device includes the repositioning device.

9. The system of claim 8, wherein the wearable device includes a repositioning sensor for detecting data associated with whether the navigation sensor is not in the desired position.

10. The system of claim 8, further comprising a repositioning sensor, wherein the repositioning sensor is utilized for determining whether the navigation sensor is in the desired position, wherein the repositioning sensor includes at least one of the following: an image capture device, a gyroscope, an accelerometer, an inertial measurement unit (IMU), or a positioning device.

11. The system of claim 7, wherein the navigation sensor includes at least one of the following: an image capture device, a microphone, a positioning sensor, or a motion sensor.

12. The system of claim 7, wherein the repositioning device includes at least one of the following: an inflatable bladder, a lever, a motor, or a rotating continuous track.

13. The system of claim 7, further comprising a repositioning output device, wherein the repositioning output device provides a repositioning command to a user for manually repositioning the wearable device.

14. The system of claim 7, further comprising a navigational output device, wherein the logic further causes the navigational output device to provide at least one navigational command to a user, wherein the navigational output device includes at least one of the following: an auditory output device or a tactile output device.

15. A system for automatic fit adjustment of a wearable device comprising:
   a wearable device for assisting a vision-impaired user, wherein the wearable device includes a navigation sensor for detecting at least one feature of an environment and wherein the wearable device includes a repositioning device for mechanically repositioning at least a portion of the wearable device; and
   a computing device that is communicatively coupled to the navigation sensor and the repositioning device, wherein the computing device includes logic that causes the system to perform at least the following:
      receive environment data from the navigation sensor,
      determine, from the environment data, whether the navigation sensor is in a desired position;
      in response to determining that the navigation sensor is not in the desired position, determine, from the desired position and the environment data, a desired repositioning to the navigation sensor for achieving the desired position;
      determine a change of the repositioning device for achieving the desired repositioning to the navigation sensor; and
      actuate the repositioning device to implement the change.

16. The system of claim 15, wherein the navigation sensor includes at least one of the following: an image capture device, a microphone, a positioning sensor, a gyroscope, an accelerometer, an inertial measurement unit (IMU), or a motion sensor.

17. The system of claim 15, wherein the repositioning device includes at least one of the following: an inflatable bladder, a lever, a motor, or a rotating continuous track.

18. The system of claim 15, further comprising a repositioning output device, wherein the repositioning output device provides a repositioning command to a user for manually repositioning the wearable device.

19. The system of claim 15, further comprising a navigational output device, wherein the logic further causes the navigational output device to provide at least one navigational command to a user, wherein the navigational output device includes at least one of the following: an auditory output device or a tactile output device.

20. The system of claim 15, wherein the navigation sensor includes at least one of the following: an image capture device, a microphone, a positioning sensor, or a motion sensor.

* * * * *